(12) United States Patent
Wu et al.

(10) Patent No.: US 10,688,707 B2
(45) Date of Patent: Jun. 23, 2020

(54) SYSTEM AND METHOD FOR FORMING FLUTED BOARD AND SCRAP RECYCLING PROCESS THEREFOR

(71) Applicant: Inteplast Group Corporation, Livingston, NJ (US)

(72) Inventors: Phillip Ching-Li Wu, Victoria, TX (US); Ronald E. Summers, Edna, TX (US)

(73) Assignee: Inteplast Group Corporation, Livingston, NJ (US)

( * ) Notice: Subject to any disclaimer, the term of this patent is extended or adjusted under 35 U.S.C. 154(b) by 353 days.

(21) Appl. No.: 15/714,386

(22) Filed: Sep. 25, 2017

(65) Prior Publication Data

US 2019/0091911 A1    Mar. 28, 2019

(51) Int. Cl.
| | |
|---|---|
| B29C 48/275 | (2019.01) |
| B26F 1/38 | (2006.01) |
| B29C 48/11 | (2019.01) |
| B29C 48/00 | (2019.01) |
| B29C 48/30 | (2019.01) |
| B29C 48/305 | (2019.01) |
| B29L 7/00 | (2006.01) |
| B26F 1/40 | (2006.01) |

(52) U.S. Cl.
CPC .......... *B29C 48/277* (2019.02); *B26F 1/384* (2013.01); *B29C 48/0022* (2019.02); *B29C 48/11* (2019.02); *B29C 48/30* (2019.02); *B29C 48/305* (2019.02); *B26F 1/40* (2013.01); *B29L 2007/002* (2013.01)

(58) Field of Classification Search
None
See application file for complete search history.

(56) References Cited

U.S. PATENT DOCUMENTS

| | | | |
|---|---|---|---|
| 4,467,969 | A | 8/1984 | Godfrey et al. |
| 5,575,418 | A | 11/1996 | Wu et al. |
| 5,848,754 | A | 12/1998 | Becker et al. |
| 6,759,114 | B2 | 7/2004 | Wu et al. |
| 8,932,043 | B2 | 1/2015 | Wilhelm |

FOREIGN PATENT DOCUMENTS

| | | |
|---|---|---|
| CN | 101053959 A | 10/2007 |
| CN | 102285020 A | 12/2011 |
| CN | 102310498 A | 1/2012 |
| CN | 103434064 A | 12/2013 |

*Primary Examiner* — Matthew J Daniels
*Assistant Examiner* — Gregory Chad Grosso
(74) *Attorney, Agent, or Firm* — Stinson LLP

(57) ABSTRACT

A system and method for forming fluted polymer boards and recycling scrap material. A feeder feeds polymer to an extruder, which extrudes fluted board stock from the polymer. A scrap portion of the board stock is separated from another portion that comes to form the boards. The recycling system returns the separated scrap portion along a return path to the feeder and forms holes in the scrap portion creating fluid communication between the flutes and atmosphere before the scrap portion is returned to the feeder. The scrap portion can, in some embodiments, be ground into granular form after being hole-punched without creating a pressure condition in the flutes that adversely affects extrusion of the board stock.

11 Claims, 4 Drawing Sheets

SYSTEM AND METHOD FOR FORMING FLUTED BOARD AND SCRAP RECYCLING PROCESS THEREFOR

FIELD

The present disclosure generally relates to a system and method for forming a fluted board and more specifically to a system and method in which scrap material is recycled without disrupting the board forming process.

BACKGROUND

Fluted polymer boards are often formed in an in-line extrusion process. Raw polymer stock is melted in a feeder and forced through an extruder. The extruder forms material having a top sheet, a parallel bottom sheet, and a plurality of ribs that extend between the top and bottom sheets at spaced apart locations along the width of the material to define the flutes. One or both edge margins of the material can become deformed in the extrusion process. To exclude the deformed edge margins from the final board product, edge trimmers are arranged downstream of the extruder to separate the edge margins from the middle portion of the material. To limit polymer waste, some board forming processes return the trimmed edge margins to the feeder for recycling.

SUMMARY

In one aspect, a board forming system for forming a fluted polymer board comprises a feeder configured to receive polymer, melt the polymer, and feed the molten polymer through the board forming system. An extruder is configured to receive the molten polymer and extrude board stock lengthwise in an extrusion direction. The board stock has a width transverse to the extrusion direction and defines a plurality of flutes extending in the extrusion direction and spaced apart from one another along the width. The board stock includes a board portion and a scrap portion along the width. Each of the board and scrap portions define at least one of the plurality of flutes. A recycling system is configured to separate the scrap portion of the board stock from the board portion along a separation line extending lengthwise of the board stock and return the separated scrap portion along a return path to the feeder. The recycling system includes a hole forming machine positioned along the return path and configured to form holes in the scrap portion before the scrap portion is returned to the feeder.

In another aspect, a method of forming a fluted polymer board comprises feeding polymer from a feeder to an extruder. The polymer is extruded from the extruder in an extrusion direction to form board stock having a width transverse to the extrusion direction and defining a plurality of flutes extending in the extrusion direction and spaced apart from one another along the width. The board stock is cut lengthwise to separate a scrap portion of the board stock defining at least one of the plurality of flutes from a board portion. Holes are formed in the scrap portion through at least a portion of the thickness of the board stock that permit fluid communication of said at least one flute through the opening. The scrap portion of the board stock is returned to the feeder after the step of forming holes.

Other aspects will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
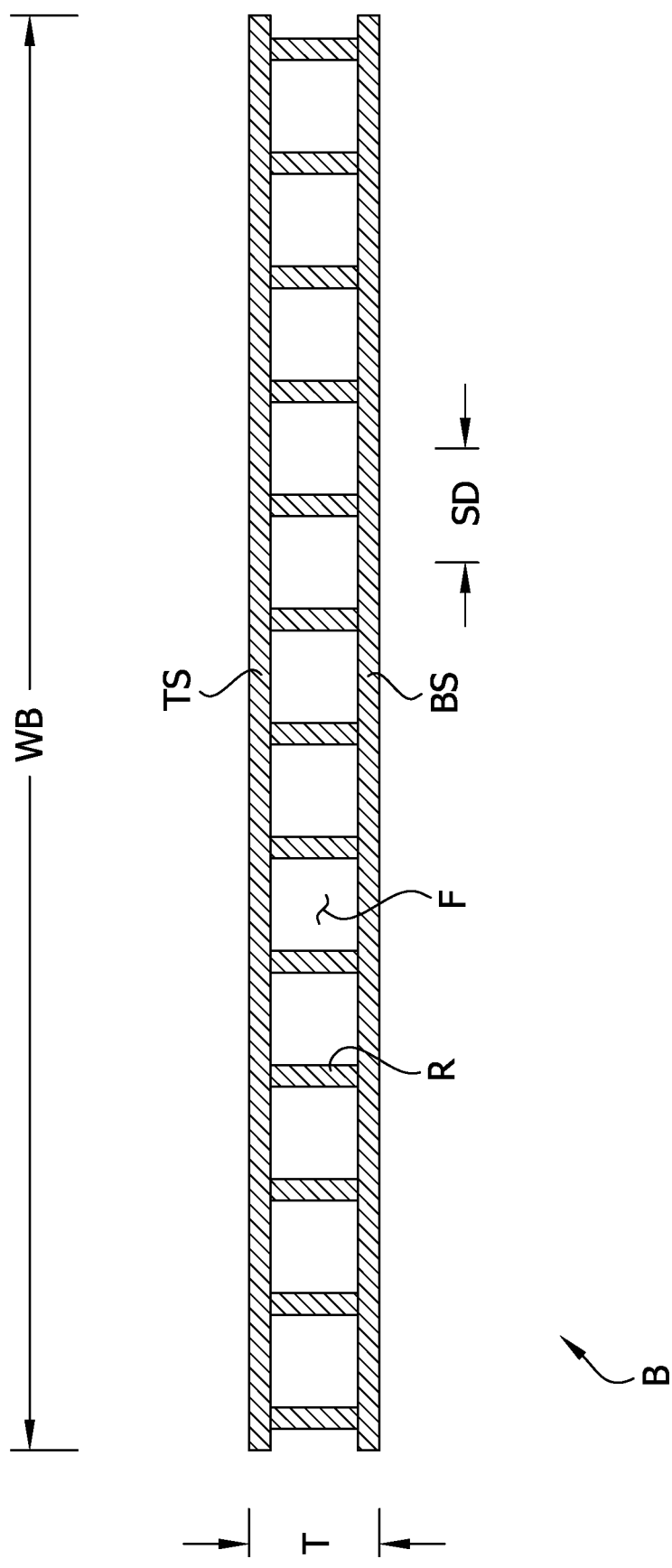
FIG. 1 is a cross section of a fluted polymer board.

Referring to FIG. 1, one embodiment of a fluted polymer board that can be formed using systems and methods described in greater detail below is generally indicated at reference character B. The board B is formed from a polymer. The polymer can be a polyolefin, such as polypropylene (PP), polyethylene (PE); a styrene polymer, such as polystyrene (PS); a polyester, such as polyethyleneterephthalate (PET), polycarbonate (PC); an acrylic, such as polymethyl methacrylate (PMMA); a vinyl polymer, such as polyvinyl chloride (PVC); etc. The board B includes a generally planar top sheet TS and a generally planar bottom sheet BS that is spaced apart from the top sheet along a thickness T of the board and oriented generally parallel to the top sheet. The top sheet TS and the bottom sheet BS each extend continuously along a width WB of the board B from a first side margin to an opposite second side margin. The length of the board extends generally perpendicular to the width WB and the thickness T. A plurality of ribs R extend along the thickness between the bottom sheet BS and the top sheet TS and divide the space between the top and bottom sheets into a plurality of flutes F that are spaced apart along the width WB of the board B and extend continuously along the length of the board. The flutes F are enclosed along the length of the board B so that changes in fluid pressure within the flutes are communicated along their entire lengths. The flutes F are spaced apart from one another by an on-center flute spacing distance SD. In the illustrated embodiment, the ribs R extend generally parallel to the thickness T of the board B between the top and bottom sheets TS, BS to define the flutes F. It will be understood that flutes can be defined by other structures (e.g., ribs that are slanted with respect to the thickness of the board, a corrugated sheet, etc.) in other embodiments.

Figure 2:
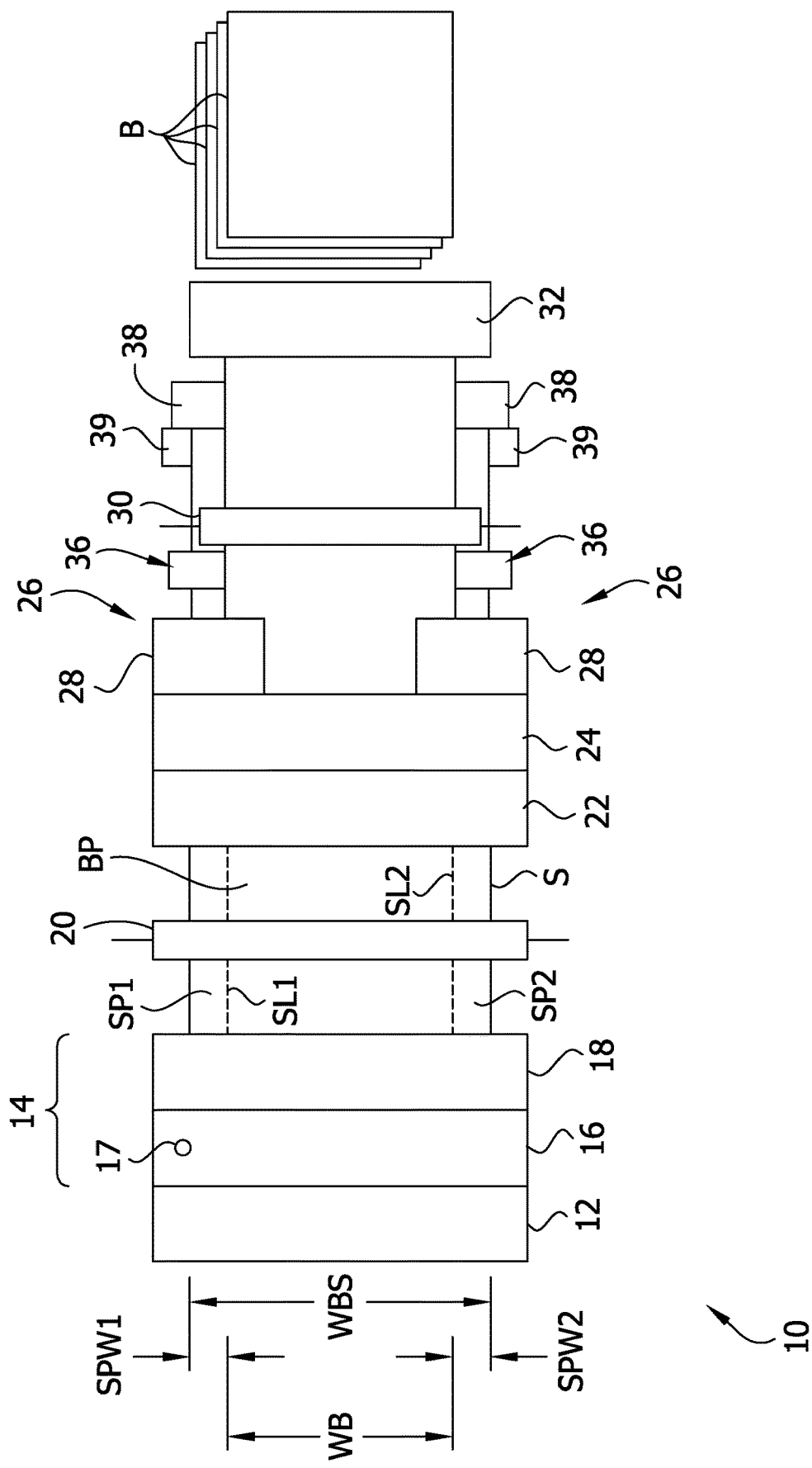
FIG. 2 is a schematic top plan view of a board forming system.
Figure 3:
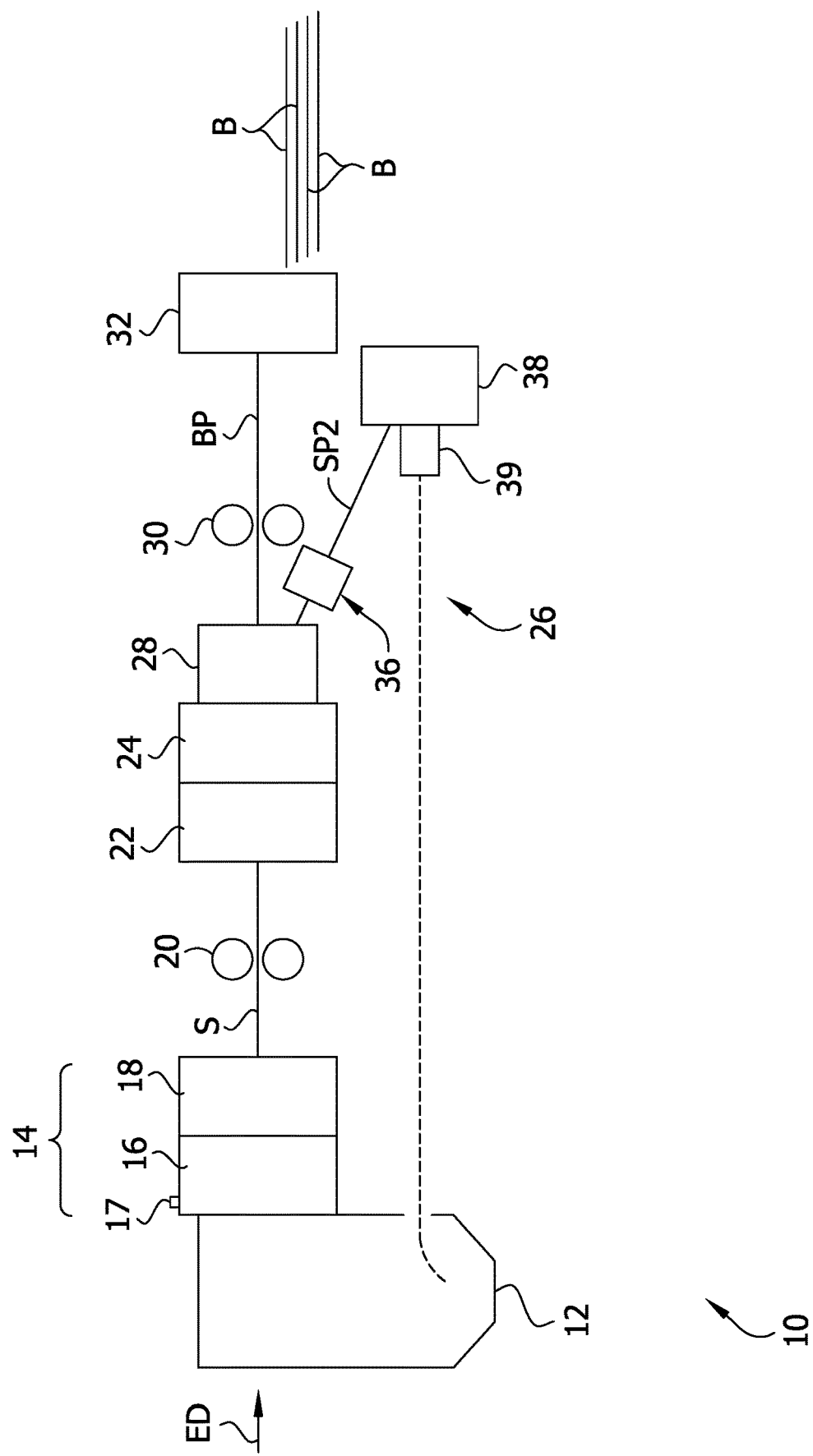
FIG. 3 is a schematic elevation of the board forming system.

Referring to FIGS. 2 and 3, an exemplary board forming system configured to form the fluted boards B is generally indicated at reference number 10. The board forming system 10 is configured to be operated as a continuous production line to form a plurality of boards B in succession. The board forming system 10 includes a feeder 12 that is configured to receive raw polymer and feed the polymer in molten form to an extrusion system 14. The feeder 12 can include a hopper that is configured to receive raw polymer stock, for example, in granular form. In one embodiment, the feeder 12 can be a screw-type feeder including a screw mechanism that feeds the polymer stock to the extrusion system 14. Such feeders melt the raw polymer into a molten state by virtue of the heat associated with friction created during feeding. Other types of feeders (e.g., feeders with active heating elements) can be used to melt and feed the polymer to the extrusion system 14 in other embodiments.

The extrusion system 14 includes an extruder 16 that is configured to extrude fluted board stock S lengthwise in an extrusion direction ED. As is understood by those skilled in the art, the extruder 16 can include a die head (not shown) that defines a slot shaped and arranged for forming polymer forced through the slot to have a desired cross-sectional shape. In an exemplary embodiment, the slot of the die head is configured to shape the polymer into fluted board stock that S having a width WBS and defining a plurality of flutes F (not shown in FIG. 2) that extend continuously along the length of the board stock and are spaced apart from one another by the flute spacing distance SD across the width of the board stock. The extruder 16 is configured to force air into the flutes F during extrusion to prevent collapse of the polymer material around the flutes. Thus, it will be understood that in normal operation of producing the board stock S, each of the flutes F contains air under pressure. The extruder 16 includes a relief vent 17 configured to release a small amount of air from the flutes F if the air pressure in the flutes becomes too high (overpressure situations are described in greater detail below). In certain embodiments, the extruder 16 can be used interchangeably with a plurality of die heads for forming board stock S having different shapes and arrangements, such as different thicknesses T. Suitably, the extruder 16 can be configured for use with at least one die head configured for extruding board stock having a thickness T of at least about 7 mm. The extruder 16 can also additionally or alternatively be configured for use with other die heads, including those that extrude board stock having a thickness of less than 7 mm.

The illustrated board forming system includes several in-line, post-extrusion treatment devices that are configured to impart certain desired properties to the board stock S. The extrusion system 14 includes a calibrator 18 that is positioned downstream of the extruder 16 to cool the extruded board stock S in a controlled manner. The controlled cooling provided by the calibrator 18 sets the cross-sectional shape and dimensions of the board stock S after extrusion. After the board stock S is calibrated, pull rollers 20 direct the board stock S through an infrared oven 22 and further through a corona treater 24. The infrared oven 22 anneals the board stock S, and the corona treater 24 corona treats the board stock to prepare the top and bottom surfaces for having a design printed on them. It will be understood that in other embodiments the board forming system can include other in-line, post-extrusion treatment devices without departing from the scope of the invention. A lesser number of in-line, post-extrusion treatment devices or no in-line post extrusion treatment devices may be used.

The width WBS of the extruded board stock S includes a board portion BP and first and second scrap portions SP1, SP2. The board portion BP has a width WB that corresponds to the width of the boards B, and the first and second scrap portions SP1, SP2 each have a width SPW1, SPW2 along the width WBS of the board stock S. As explained below, the board forming system 10 forms the board portion BP into a plurality of separate boards B and recycles the scrap portions SP1, SP2. In the illustrated embodiment, the scrap portions SP1, SP2 are located along opposite first and second edge margins of the board stock S. In other embodiments, the scrap portion could comprise only one edge margin or portions of the board stock other than or in addition to the edge margin(s). The edge margins of the board stock S can become deformed in certain extrusion processes such that they must be removed from the board stock to form salable boards B. In addition, board purchasers often desire boards B having widths WB that are smaller than the width WBS of the board stock S. Thus, the scrap portions SP1, SP2 of the board can be separated from the board portion BP along the length of the board stock S to produce boards B having the desired width WB.

So as not to waste the polymer forming the scrap portions SP1, SP2, the illustrated board forming system 10 includes a recycling system 26 for each edge margin of the board stock S that is configured to return the polymer material in the respective scrap portion SP1, SP2 to the feeder 12 for reuse in the board forming process. Each recycling system 26 includes an edge trimmer 28 configured to separate the respective scrap portion SP1, SP2 from the board portion BP. The edge trimmer 28 is configured to cut the board stock S along a respective separation line SL1, SL2 extending along the length of the board stock S. Any edge trimmer (e.g., shears, a saw, a water jet, a laser cutter, a knife, etc.) capable of continuously cutting the board stock S through the entire thickness T as the board stock travels through the board forming system 10 can be used without departing from the scope of the invention.

After the recycling systems 26 separate the scrap portions SP1, SP2 from the board portion BP, another pair of pull rollers 30 pulls the board portion toward a board cutting machine 32. The board cutting machine 32, which in some embodiments comprises a guillotine or a heat cutter, is configured to repeatably cut the board portion BP (now separated from the scrap portions SP1, SP2 at the separation lines SL1, SL2) along the width WB at spaced apart locations along the length of the board stock S. Thus, as the extruder 16 extrudes the board stock S, the board cutting machine 32 repeatably cuts the board portion BP widthwise to form separate boards B. When a guillotine is used for the board cutting machine 32, each time the guillotine blade is engaged to cut the board portion BP, it momentarily pinches the material and thereby seals the ends of the flutes F that extend continuously from the extruder 16 to the cutting machine. The air pressure applied to the flutes F to hold them open normally is relieved through the open ends of the flutes. However during this momentary sealing of the flutes F air does not escape, causing a build-up of pressure at the extruder 16. The vent 17 of the extruder 16 vents excess pressure in the flutes that is generated by the extruder continuing to inject air into the flutes while they are sealed by the guillotine 32. Because the guillotine 32 closes off the flutes for only a short amount of time, the vent 17 is capable of providing sufficient pressure relief to prevent an overpressure condition that would adversely affect the extrusion of the board stock S.

FIG. 3 illustrates the recycling system 26 for the second scrap portion SP2. It will be understood that, in the illustrated embodiment, the recycling system for the first scrap portion SP1 has the same components and operates in the same manner, and thus the both recycling systems are described below in reference to FIG. 3. After separating the scrap portions SP1, SP2 from the board stock S, each recycling system 26 is configured to continuously return the respective scrap portion along a return path to the feeder 12 so that the material can be reused in the board forming process as explained below. Thus, each scrap portion SP1, SP2 extends from the extruder 16 through the post-extrusion processing devices 18, 22, 24 and then extends through recycling system 26 along the return path until it is fed back into the feeder 12.

Positioned along the return path, each recycling system 26 includes a punching machine 36 (broadly, a hole forming machine), a grinder 38 downstream of the punching machine, and a blower 39 downstream of the grinder. As explained below, each punching machine 36 is configured to punch holes (broadly, form holes) in the respective scrap portion SP1, SP2 for fluidly connecting the flutes F to atmosphere at a location between the extruder 16 and the grinder 38. The grinder 38 is configured to grind the respective scrap portion SP1, SP2 into granular polymer, and the blower 39 (broadly, a polymer return device) is configured to blow (broadly, move) the granular polymer into the feeder 12 for being melted and fed back into the extruder 16. In one or more embodiments, the grinding action of the grinder 38 is configured to draw the respective scrap portion SP1, SP2 into the grinder so that no additional drive mechanism is required to drive the scrap portion into the grinder. Other embodiments can include an additional drive mechanism such as a pair of feed rollers. Any suitable grinder for grinding the respective scrap portion SP1, SP2 before it is returned to the feeder can be used without departing from the scope of the invention. For example, the grinder 38 can comprise one or more grinding wheels that rotate to compress and shred the respective scrap portion SP1, SP2. Any suitable polymer return device 39 may likewise be used to move the ground polymer into the feeder. For example, in one or more embodiments, a conveyor belt or auger can be used instead of the blower 39. Suitably, the blower 39 can be configured to blow the granular polymer along a chute or other guide structure (not shown) that guides the granular material to the feeder 12.

Depending on the type of the grinders 38, the grinding action can affect the pressure inside the flutes F of the scrap portions SP1, SP2 in different ways. For example, like the guillotine 32 described above, the grinders 38 close off the open ends of the flutes F in the scrap portions SP1, SP2. However, the closure can be essentially constant so that instead of an instantaneous build-up and release of pressure, the pressure can continue to increase because of the injection of air at the extruder 16 to hold the flutes F open. Unlike the guillotine 32, the grinder can compress the respective scrap portion SP1, SP2 along the thickness T and thereby collapse the flutes at the grinder. Air from the collapsed flutes travels rearward in the uncollapsed flutes of the scrap portions SP1, SP2 back to the extruder 16. The volume of this air can readily exceed the capacity and/or responsiveness of the vent 17, causing overpressure and malformation of the board stock S by the extruder 16. This is particularly problematic for board stock S of a relatively large thickness (e.g., greater than or equal to about 7 mm), where the flutes F contain larger volumes of air. As explained below, however, the punching machines 36 prevent this excess of pressure by fluidly coupling the flutes F of the scrap portions SP1, SP2 to atmosphere, which allows the board forming system 10 to both form boards B of thickness of at least about 7 mm and recycle the attendant scrap in a continuous, in-line process. In other embodiments of the grinders 38, the compression of the scrap portions SP1, SP2 caused by the grinding action can also create a vacuum pressure in the flutes F that causes the polymer material to collapse around the flutes. The punching machines 36 likewise prevent the formation of a vacuum by creating a direct fluid pathway between the flutes F and atmosphere.

In general, the recycling system 26 is configured to guide the respective scrap portion SP1, SP2 lengthwise along the return path through the punching machine 36. In one embodiment, the punching machine 36 is configured to repeatably punch holes in the respective scrap portion SP1, SP2 that extend through the entire thickness T of the material. In other embodiments, the punching machine 36 is configured to punch holes that extend through only a portion of the thickness T, such as through only the top sheet TS and/or only the bottom sheet BS. By punching holes that extend through at least one of the top and bottom sheets TS, BS, the punching machine 36 creates a fluid pathway at each hole between at least one flute F and atmosphere. Generally, the punching machine 36 is configured to repeatably punch holes in the respective scrap portion SP1, SP2 at spaced apart locations along the length of the scrap portion (e.g., in one embodiment the punching machine can be configured to punch holes generally aligned along the width SPW1, SPW2 of the respective scrap portion that are spaced apart by less than or equal to about 7 inches along the length) as the scrap portion is guided lengthwise along the return path. Similarly, the punching machine 36 is configured to repeatably punch holes in the respective scrap portion SP1, SP2 that are spaced apart along the width SPW1, SPW2 of the scrap portion (e.g., the punching machine can be configured to punch holes that are spaced apart by less than about 1.5 inches along the width of the scrap portion, e.g., less than about 0.5 inches). For example, in one or more embodiments the punching machine 36 is configured to punch holes in the respective scrap portion SP1, SP2 that are spaced apart from one another along the width SPW1, SPW2 by about the flute spacing distance SD so that the punching machine repeatably punches holes in each of the flutes F. The holes formed by the punching machines fluidly couple all of the flutes F in the scrap portions SP1, SP2 to atmosphere so that, even for board stock S of a large thickness T, the pressure in the flutes between the extruder 16 and the grinders 38 is maintained at about atmospheric pressure so that each grinder is prevented from creating pressure conditions in the flutes that would adversely affect extrusion.

Figure 4:
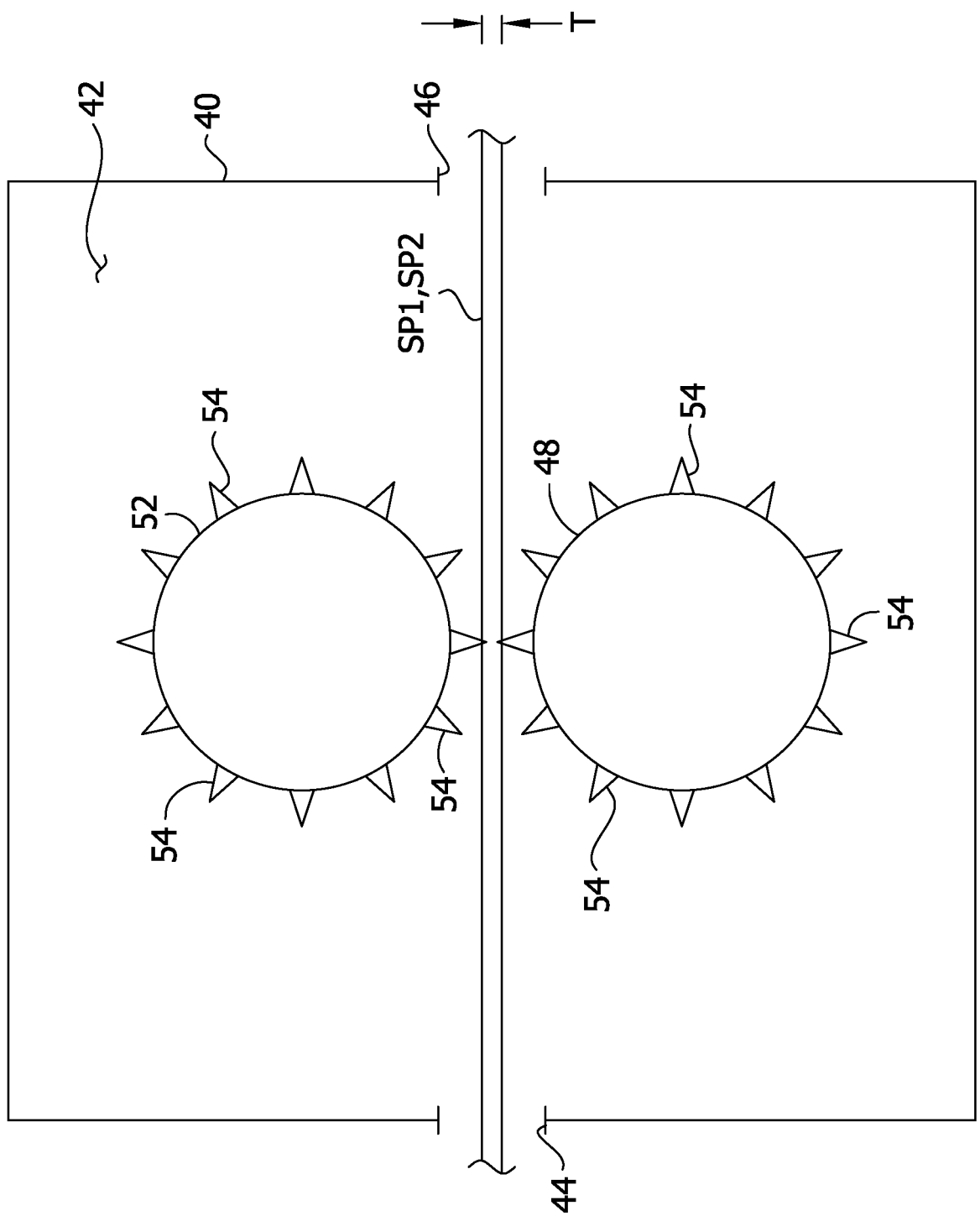
FIG. 4 is a schematic illustration of a punching machine of the board forming system.

Referring to FIG. 4, in one embodiment, the punching machine 36 comprises a housing 40 defining a punching chamber 42 for receiving the respective scrap portion SP1, SP2 as it is drawn into the grinder 38. The housing 40 has an upstream end defining an inlet opening 44 and a downstream end defining an outlet opening 46. The respective scrap portion SP1, SP2 extends through the punching chamber 42 from the inlet opening 44 through the outlet opening 46. In the illustrated embodiment, two cylindrical punching rollers 48, 52 are mounted on the housing 40 inside the punching chamber 42 for rotation about their respective axes. A plurality of spikes 54 extend radially outward from the punching roller 48, 52 at a plurality of circumferentially spaced positions and a plurality of positions that are spaced apart along the axis of the roller. As the respective scrap portion SP1, SP2 is drawn between the punching rollers 48, 52, the punching rollers rotate about their axes, and the spikes 54 are forced through at least a portion of the thickness T of the scrap portion as they rotate into opposing relation with the scrap portion. The revolving spikes 54 thus form holes at spaced apart locations along the length and width of the scrap portion SP1, SP2 as it is fed through the respective punching machine 36. In one embodiment, rows of circumferentially spaced apart spikes 54 are spaced apart from one another along the axis of the respective roller 48, 52, and the spikes within adjacent rows are circumferentially offset from one another so that adjacent rows of spikes punch holes in the respective scrap portion SP1, SP2 at different times as the roller rotates about its axis. It will be understood that other types of punching machines could be used in other embodiments. For example, punching machines having other roller configurations (e.g., machines having other numbers and arrangements of punching rollers, machines having one or more non-punching feed rollers or other drive mechanisms for moving the scrap portion through the machine, etc.) or press-type punching machines (e.g., a machine with a spiked punch plate that is repeatably driven along an axis against the top and/or bottom sheet TS, BS of the scrap portion SP1, SP2 to punch holes as the scrap portion is fed through the machine) are expressly contemplated within the scope of the invention. Still other types of punching machines and other types of hole forming machines (e.g., drills, water jets, lasers, heat cutters, etc.) can also be used without departing from the scope of the invention.

Referring again to FIGS. 2 and 3, during use of the board forming system 10, the feeder 12 continuously feeds molten polymer to the extruder 14 and the extruder extrudes the board stock S. The calibrator 18 cools the extruded board stock S to set the shape, and the pull rollers 20 pull the board stock from the extrusion system 14 toward the infrared oven 22 and corona treater 24, which treat the board stock as described above. The edge trimmers 28 cut the board stock S lengthwise along the separation lines SL1, SL2 to separate the scrap portions SP1, SP2 from the board portion BP, and the pull rollers 30 pull the board portion toward the board cutter 32. The board cutter 32 cuts the board portion BP widthwise to form separate boards B that are then arranged in a stack at the downstream end of the board forming system 10. As needed, the vent 17 relieves pressure from the flutes F of the board stock S created by the momentary cutting action of the board cutter 32. After separating the scrap portions SP1, SP2 using the edge trimmers 28, the recycling systems 26 move the scrap portions along the return path at a rate of travel that corresponds to the extrusion speed. The grinders 38 pull the scrap portions SP1, SP2 through the punching machines 36. The punching machines 36 punch holes through the top and bottom sheets TS, BS of the scrap portions SP1, SP2 at spaced apart positions along the length and width of the scrap portions. The grinders 38 grind the hole-punched scrap portions SP1, SP2 into granular form. The blowers 39 receive the polymer and blow it in granular form to the feeder 12, which reuses the polymer in the board forming process. As the scrap portions SP1, SP2 are ground by the grinders 38, the holes formed by the punching machines 36 provide fluid communication between the flutes F and atmosphere to regulate the pressure inside the flutes to atmospheric pressure. Accordingly, even for board stock S having a thickness T greater than or equal to about 7 mm, the grinders 38 can grind the scrap portions SP1, SP2 extending continuously between the extruder 16 and the grinders without adversely affecting the extrusion process or board quality.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products and methods without departing from the scope of the invention, it is intended that all matter contained in the above description shall be interpreted as illustrative and not in a limiting sense.

What is claimed is:

1. A board forming system for forming a fluted polymer board, the system comprising:
a feeder configured to receive polymer, melt the polymer, and feed the molten polymer through the board forming system;
an extruder configured to receive the molten polymer and extrude board stock lengthwise in an extrusion direction, the board stock having a width transverse to the extrusion direction and defining a plurality of flutes extending in the extrusion direction and spaced apart from one another along the width, the board stock including a board portion and a scrap portion along the width, each of the board and scrap portions defining at least one of the plurality of flutes; and
a recycling system configured to separate the scrap portion of the board stock from the board portion along a separation line extending lengthwise of the board stock and return the separated scrap portion along a return path to the feeder, the recycling system including a hole forming machine positioned along the return path and configured to form holes in the scrap portion before the scrap portion is returned to the feeder.

2. A board forming system as set forth in claim 1 wherein the hole forming machine is configured to form holes in the scrap portion of the board stock that are spaced apart along a width of the scrap portion.

3. A board forming system as set forth in claim 2 wherein the hole forming machine is configured to form holes in the scrap portion of the board stock that are spaced apart by less than about 1.5 inches along the width of the scrap portion.

4. A board forming system as set forth in claim 2 wherein the hole forming machine is configured to form holes in the scrap portion that are spaced apart from one another along the width of the scrap portion by a distance corresponding to a distance which the flutes are spaced across the width of the board stock.

5. A board forming system as set forth in claim 1 wherein the recycling system is configured to guide the scrap portion lengthwise of the scrap portion along the return path, the hole forming machine being configured to form holes in the scrap portion at spaced apart locations along the length as the scrap portion is guided lengthwise along the return path.

6. A board forming system as set forth in claim 5 wherein the hole forming machine is configured to form holes in the scrap portion that are spaced apart by less than or equal to about 7 inches along the length of the scrap portion.

7. A board forming system as set forth in claim 1 wherein the recycling system further comprises a grinder positioned along the return path downstream of the hole forming machine and configured to grind the scrap portion into granular polymer after the holes are formed.

8. A board forming system as set forth in claim 7 wherein the board forming system is configured such that the scrap portion extends continuously from the extruder to the grinder.

9. A board forming system as set forth in claim 1 further comprising a cutting machine configured to cut the board portion along the width of the board stock as the board stock travels through the board forming system to form separate boards.

10. A board forming system as set forth in claim 1 wherein the extruder is configured to extrude board stock having a thickness of at least about 7 mm.

11. A board forming system as set forth in claim 1 wherein the hole forming machine comprises a punching machine configured to punch holes in the board stock.

* * * * *